(12) United States Patent
Stojc

(10) Patent No.: US 7,004,516 B2
(45) Date of Patent: Feb. 28, 2006

(54) LOCK LATCH MECHANISM FOR TRANSIT VEHICLE DOOR SYSTEM

(75) Inventor: Andre Stojc, Ile Bazard (CA)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 0 days.

(21) Appl. No.: 10/777,589

(22) Filed: Feb. 11, 2004

(65) Prior Publication Data

US 2004/0160065 A1  Aug. 19, 2004

Related U.S. Application Data

(62) Division of application No. 10/229,582, filed on Aug. 28, 2002, now Pat. No. 6,712,406.

(51) Int. Cl.
 *E05C 3/06* (2006.01)
(52) U.S. Cl. .................... 292/201; 292/144; 49/116
(58) Field of Classification Search ............... 292/144, 292/201, 95, 195, DIG. 46; 49/279–280, 49/139–140, 116, 118
See application file for complete search history.

(56) References Cited

U.S. PATENT DOCUMENTS 3,455,058 A * 7/1969 Hewitt ................... 292/140
4,142,326 A * 3/1979 Schmitz ................... 49/118
4,198,786 A * 4/1980 Monot ..................... 49/362
4,897,959 A * 2/1990 Worden ..................... 49/18
4,901,474 A * 2/1990 Bayard et al. ............ 292/144
4,934,488 A * 6/1990 Umemura ................. 49/116
5,299,385 A * 4/1994 McConnell ................. 49/18
6,009,668 A * 1/2000 Reddy .................... 49/280
6,446,389 B1 * 9/2002 Heffner et al. ............ 49/280

* cited by examiner

Primary Examiner—Brian E. Glessner
Assistant Examiner—Christopher Boswell
(74) Attorney, Agent, or Firm—James Ray & Assoc.

(57) ABSTRACT

A lock latch mechanism disposed within a powered locking device of a transit vehicle door system for maintaining a lock lever in an unlock position without the aid of the lock actuator. The lock latch mechanism includes a lock latch lever biased for engagement with an unlock cam through the use of a bias spring. The lock latch mechanism further includes a reset lever assembly engaging such lock latch lever during the door closing motion to allow movement of the lock lever form such unlocking position into such locking position to maintain at least one door of the transit vehicle in the fully closed and lock position. A manual release lever is provided to move the lock lever from such locking position into such unlocking position enabling the lock latch mechanism to maintain the lock lever in such unlocked position.

11 Claims, 6 Drawing Sheets

LOCK LATCH MECHANISM FOR TRANSIT VEHICLE DOOR SYSTEM

CROS-REFERENCE TO RELATED APPLICATIONS

This application is a Divisional Application of patent application Ser. No. 10/229,582 filed Aug. 28, 2002 now U.S. Pat. No. 6,712,406 issued on Mar. 30, 2004.

FIELD OF THE INVENTION

The present invention relates, in general, to passenger transit vehicle door systems and, more particularly, the instant invention relates to passengers transit vehicle door systems having powered door lock mechanisms.

BACKGROUND OF THE INVENTION

Door locks for passenger transit vehicles are a major operational concern inasmuch as they must provide fail-proof locking of the doors in the event of a door mechanism failure to prevent unintentional opening movement of such doors which would permit a passenger to fall out of the vehicle when it is in motion. Yet they must allow for normal door movement upon receipt of the legal open command. It is well known that powered door locks used in the passenger transit door systems utilize a continuous duty independent lock actuator, generally of an electrical, pneumatic, or hydraulic type, engaging a locking member either directly or through an additional linkage to move the locking member into an unlock position. Such locking member generally engages a locking linkage connected to at least one door or a door hanger of a passenger transit vehicle. Such at least one door being in the fully closed and locked position.

Generally, the door is connected to a powered door operator having a prime mover for moving such at least one door in the opening or closing direction. It can be seen from the above discussion that there is a need to enable an independent lock actuator prior to enabling the primary prime mover disposed within a door operator in order to move the at least one door in the opening direction.

Furthermore, the locking member must be maintained in the unlock position for -a predetermined amount of time to allow predetermined movement of at least one door in the opening direction and, more particularly, to allow for the locking linkage connected to at least one door to move in the opening direction to clear the locking member and to allow for removal of power to the independent lock actuator.

Generally, a typical passenger transit vehicle includes at least two to as many as twenty four door systems having a powered lock mechanism and sharing one power source. The requirement to enable the independent lock actuator in working cooperation with a primary mover disposed within a door operator increases power consumption and, more particularly, increases the installation and operating costs to provide such increased power consumption for every door opening movement. Thus, it can be seen from the above discussion that there is a need to reduce power consumption during the unlocking phase of the door movement in the opening direction.

Normally, electrical door systems utilize continuous duty type solenoid lock actuators to minimize power consumption during the unlocking motion. These type of solenoid lock actuators are susceptible to frictional forces and misalignment of the lock mechanism due to vibration or other factors and may result in unreliable operation. Therefore, it is desirable to utilize a more powerful, non-continuous duty type solenoid lock actuator to improve reliability of the door unlocking.

To compensate for design and installation tolerances of the door system components typical unlocking mechanisms include a variety of adjustments to compensate for such tolerances. The unlocking situation is exacerbated by the fact that certain permitted lateral movement of the doors in the closed and locked position exists due to overall system tolerances as well as preload between door edges typically used within door systems. Therefore the adjustments are performed after installation of all door system components and usually require several iterations to assure proper operation. Substantial reduction in the need for adjustment further reduces door system installation costs and increases assembly throughput of the passenger transit vehicle.

For reasons of allowing emergency passenger egress when a power source may not be present to drive the doors in the open direction it is desirable for a locking system for a passenger transit vehicle to be unlocked manually therein allowing for subsequent manual door movement toward an open direction.

SUMMARY OF THE INVENTION

The present invention provides a lock latch mechanism disposed within a powered locking device of a transit vehicle door system for maintaining a lock lever in an unlock position without the aid of the lock actuator. The lock latch mechanism includes a lock latch lever spring biased for engagement with an unlock cam through the use of a bias spring means. The lock latch mechanism further includes a reset lever assembly having a pivotably mounted reset lever engaging such lock latch lever during the door closing motion to disengage the lock latch lever form the unlock cam which allows movement of the lock lever from such unlocking position into such locking position to maintain at least one door of the transit vehicle in the fully closed and locked position. A manual release lever is provided to move the lock lever from such locking position into such unlocking position thereby enabling the lock latch mechanism to maintain the lock lever in such unlock position.

OBJECTS OF THE INVENTION

It is therefore one of the primary objects of the present invention to provide a simple and reliable lock latch mechanism for a transit vehicle door system that reduces power consumption during unlocking motion.

Another object of the present invention is to provide a simple lock latch mechanism for a transit vehicle which does not require an independent reset action.

Yet another object of the present invention is to provide a simple lock latch mechanism for a transit vehicle which improves reliability of the unlocking operation.

An additional object of the present invention is to provide a simple lock latch mechanism for a transit vehicle having means to bias the door(s) in the unlocked position.

Yet an additional object of the present invention is to provide a simple lock for a transit vehicle having means to manually unlock at least one door.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
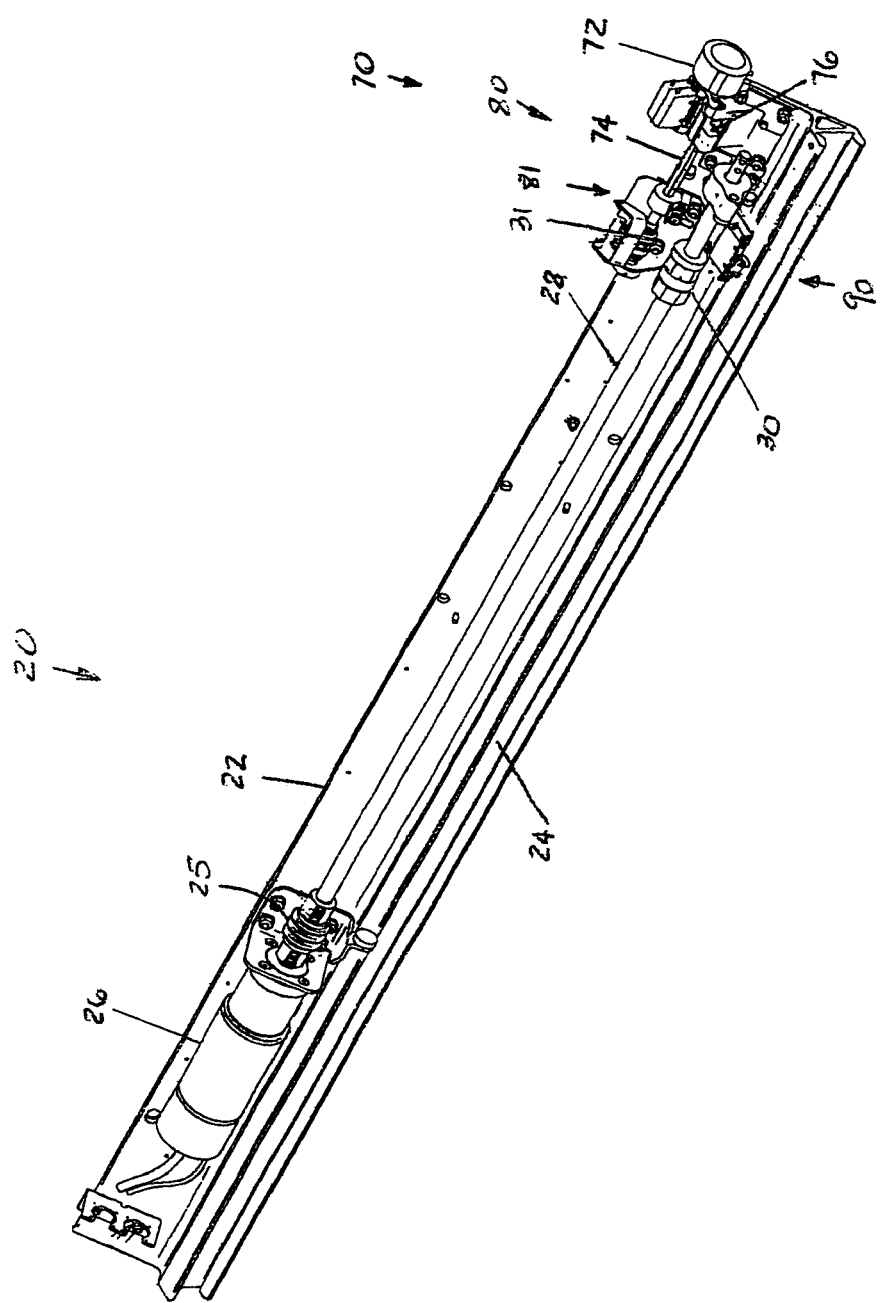
FIG. 1 is a pictorial view of a door operator containing the lock latch mechanism of the present invention.

BRIEF DESCRIPTION OF THE PRESENTLY PREFERRED AND VARIOUS ALTERNATIVE EMBODIMENTS OF THE INVENTION

Prior to proceeding to the more detailed description of the instant invention, it should be noted that identical components which have identical functions have been identified with identical reference numerals throughout the several views illustrated in the drawing figures for the sake and clarity in understanding the invention.

Furthermore, the detailed description of the present invention will be presented on a configuration of bi-parting doors. It will be obvious to those persons who are skilled in the relevant art from that operation of the locking device for a single door will be identical other than the number of additional components associated with a second door.

The invention disclosed herein overcomes application difficulties with locking devices through the use of a lock latch mechanism disposed within a door lock mechanism capable of maintaining the lock lever in the unlock position without the aid of power from the lock actuator. Such lock latch mechanism is resetable during the door closing and locking motion for movement of the lock lever from such unlock position into such lock position.

Figure 2:
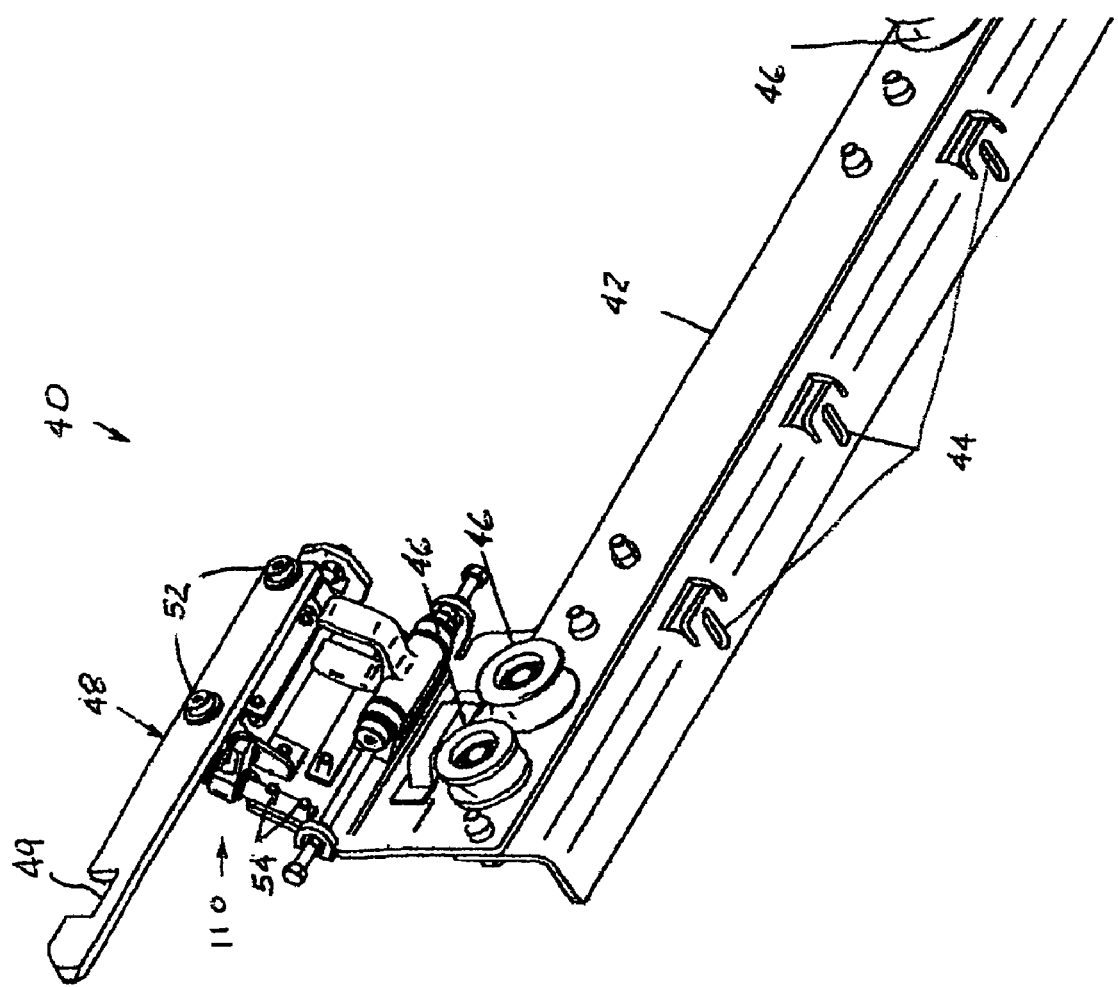
FIG. 2 is a pictorial view of a door hanger assembly containing a reset lever of the present invention.

With respect to FIG. 1 there is shown a pictorial view of the door operator, generally designated 20, comprising a base plate 22 for mounting to the structure of the passenger transit vehicle. A primary mover 26 is attached to the base plate 22. There is a drive member 28 rotatably connected to the prime mover 26 with an universal joint 25. A drive nut 30 engages such drive member 28 to be driven thereby upon rotation of the drive member 28 activated by the primary mover 26. A roller cavity 24 is disposed substantially longitudinally within the base plate 22 for engaging a plurality of rollers 46 disposed within a door hanger assembly, generally designated 40, best shown in FIG. 2.

The hanger assembly 40 further includes a hanger bracket 42, at least one cavity 44 disposed within such hanger bracket 42 for attachment to a first door (not shown). A first lock bar 48 having a lock cavity 49 is attached to the hanger bracket 42 with fasteners 52. Additionally, a second door hanger assembly, generally designated 60, partially shown in FIGS. 3 through 6, is used for attachment to a second door (not shown) of a bi-parting door configuration. There is a reset lever assembly, generally designated 110, attached to hanger bracket 42 with fasteners 54.

In further reference to FIG. 1, there is shown a lock assembly, generally designated 70, comprising a lock actuator 72, of a pneumatic or hydraulic type, but preferably a rotary solenoid, connected to a lock shaft 74 at one end. Such lock shaft 74 is further connected to a manual release lever 31 at the distal end. A lock lever 76 is disposed intermediate the lock actuator 72 and manual release lever 31 for engagement with lock cavity 49 disposed within first lock bar 48 and lock cavity 69 disposed within second lock bar 68.

Figure 3:
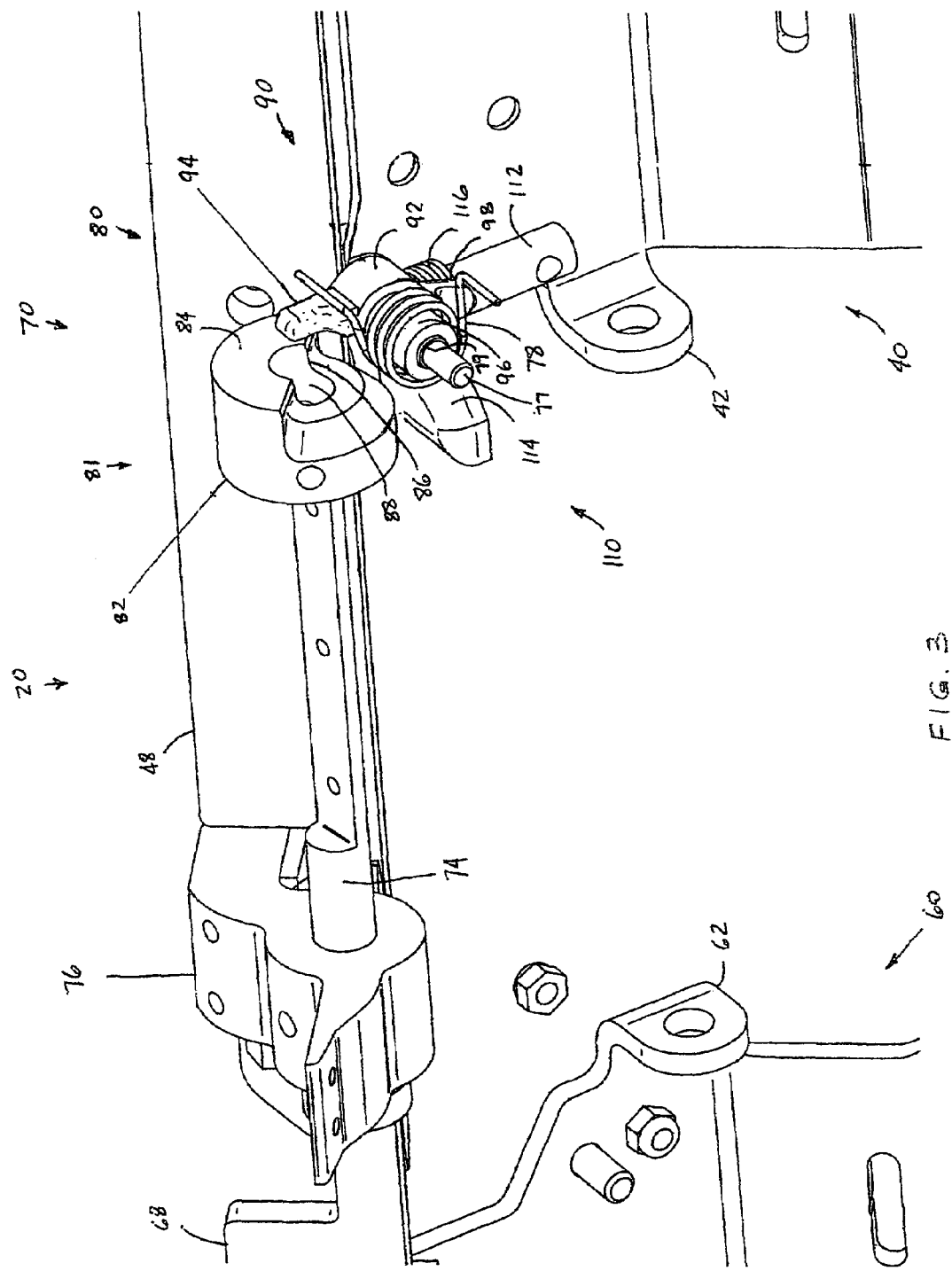
FIG. 3 is a pictorial view of the lock latch mechanism of the present invention, particularly showing orientation of components with the door in a closed and locked position.

In the presently preferred embodiment, lock lever 76 is pivotably connected to lock shaft 74 so that gravity biases it toward the locking position, as shown in FIG. 3. An unlock cam, generally designated 81, is pivotably connected to the lock shaft 74 for maintaining such lock lever 76 in an unlock position during an unlocking motion of the door (not shown).

The details of the lock latch mechanism, generally designated 80, are best shown in FIGS. 3 through 6. It includes the unlock cam, generally designated 81, comprising a cylindrical first surface portion 82, a second surface portion 84 substantially perpendicular to the first surface portion 82 and a cavity 88 disposed within such first surface portion 82. The cavity 88 is disposed perpendicular to such second surface portion 84 and a third surface portion 86 is disposed perpendicular to the second surface portion 84. The third surface portion engages the cavity 88 at the distal end. Such cavity 88 having a predetermined diameter for attachment to lock shaft 74 at one end. Such unlock cam 81 can be manufactured from various types of materials, including steel and aluminum, but preferably, such unlock cam 81 is manufactured from a self-lubricating polymer material to substantially minimize friction upon engagement with a lock latch lever, generally designated 90, pivotably attached to the door hanger assembly 40 at pivot 77.

In the presently preferred embodiment, the pivot 77 is disposed within a self lubricating sleeve 79 to reduce friction forces during rotation of the lock latch lever 90 about pivot 77. Such lock latch lever 90 includes a first surface portion 92, a second surface portion 96 substantially concentric to the first surface portion 92, a detent portion 94 disposed substantially perpendicular to the first surface portion 92 and a reset portion 98 disposed substantially perpendicular to such first surface portion 92. The reset portion 98 is disposed opposite the detent portion 94. A first spring means 78 engages the second surface portion 96 and biases the detent portion 94 for engagement with the unlock cam 81 during an unlocking motion.

In the presently preferred embodiment the first spring means 78 is a coil torsion spring having a predetermined length to apply a predetermined force onto a detent portion 94 for substantial engagement with such unlock cam 81 during an unlocking motion.

The final element of the lock latch mechanism 80, of the instant invention, is a reset lever assembly 110 having a mounting portion 112 attached to such door hanger 42. A reset lever 114 is pivotably attached to such mounting portion 112 and a second spring means 116 engages the mounting portion 112 and further engaging such reset lever 114 to bias the reset lever 114 for engagement with the reset portion 98 during the locking motion.

In the presently preferred embodiment the second spring means 116 is a coil torsion spring having a predetermined length to apply a predetermined force onto the reset portion 98 for disengagement of such detent portion 94 during a locking motion.

Figure 4:
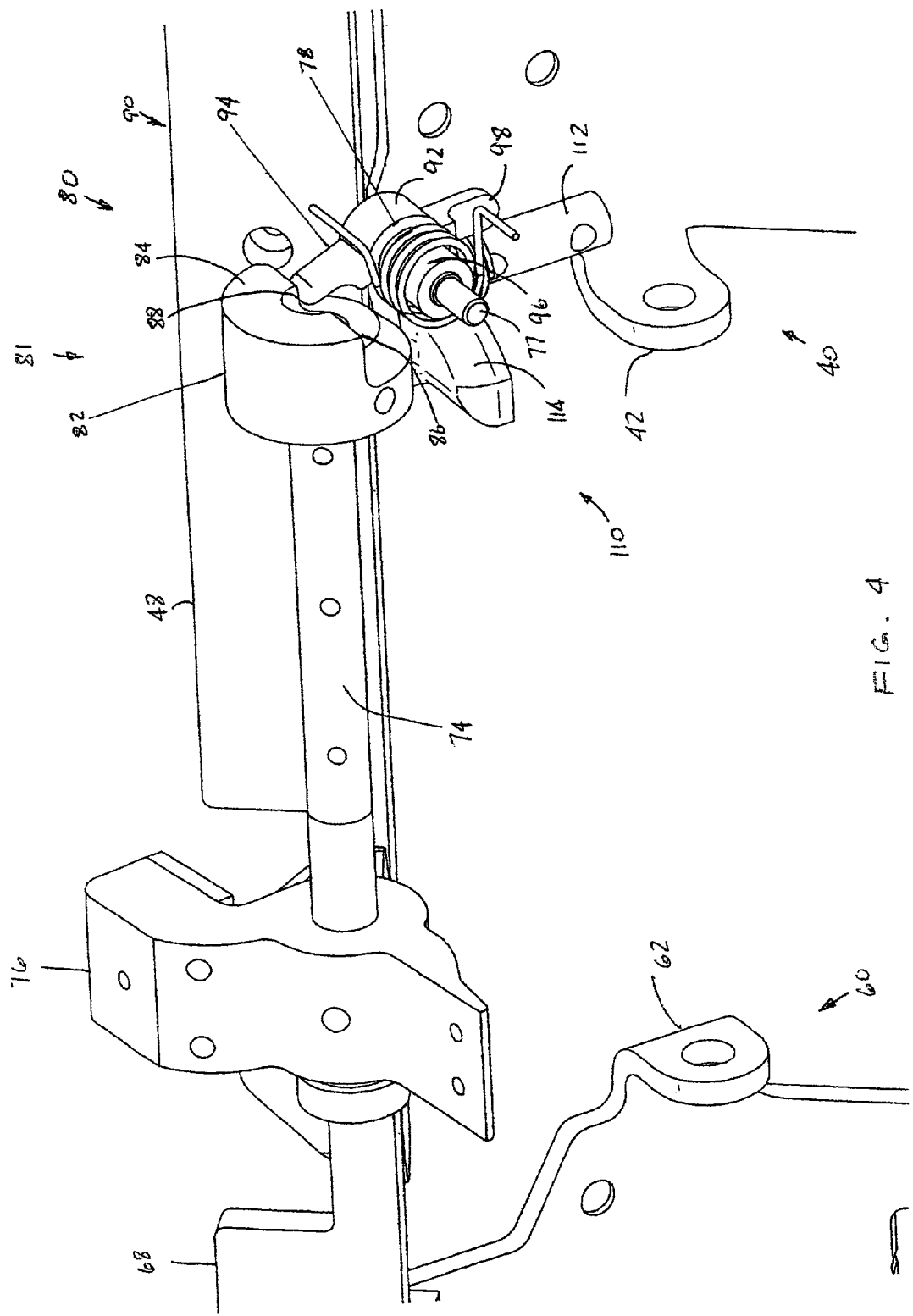
FIG. 4 is a pictorial view of the lock latch mechanism of the present invention, particularly showing orientation of components with the door in a closed and unlocked position.

In further reference to FIG. 3, showing the door hanger assemblies 40 and 60 in a closed and locked position, such lock lever 76 engages such first and second lock bars 48 and 68, respectively. Furthermore, the detent portion 94 engages such unlock cam 81 and is biased toward its second surface portion 84 with first spring means 78. Energization of lock actuator 72 rotates lock shaft 74 causing lock lever 76 to disengage lock bars 48 and 68 and further causing rotation of unlock cam 81. Rotation of the cam 81 causes detent portion 94, biased by first spring means 78, to move about second surface portion 84 engaging third surface portion 86, as best shown in FIG. 4, and further engaging cavity 88, as best shown in FIG. 5.

Such detent portion 94 engages the cavity 88 and prevents the lock lever 76 from reengaging lock bars 48 and 68, thus allowing the solenoid 72 to be de-energized prior to energization of the primary mover 26. A person skilled in the art will recognize that instantaneous energization of the solenoid 72 requires only a pulse of power to unlock the doors (not shown) consuming less energy and preventing such solenoid 72 from overheating. Therefore, a more powerful non-continuous duty type solenoid 72 can be selected and thereby increase the reliability of the unlocking operation.

Figure 5:
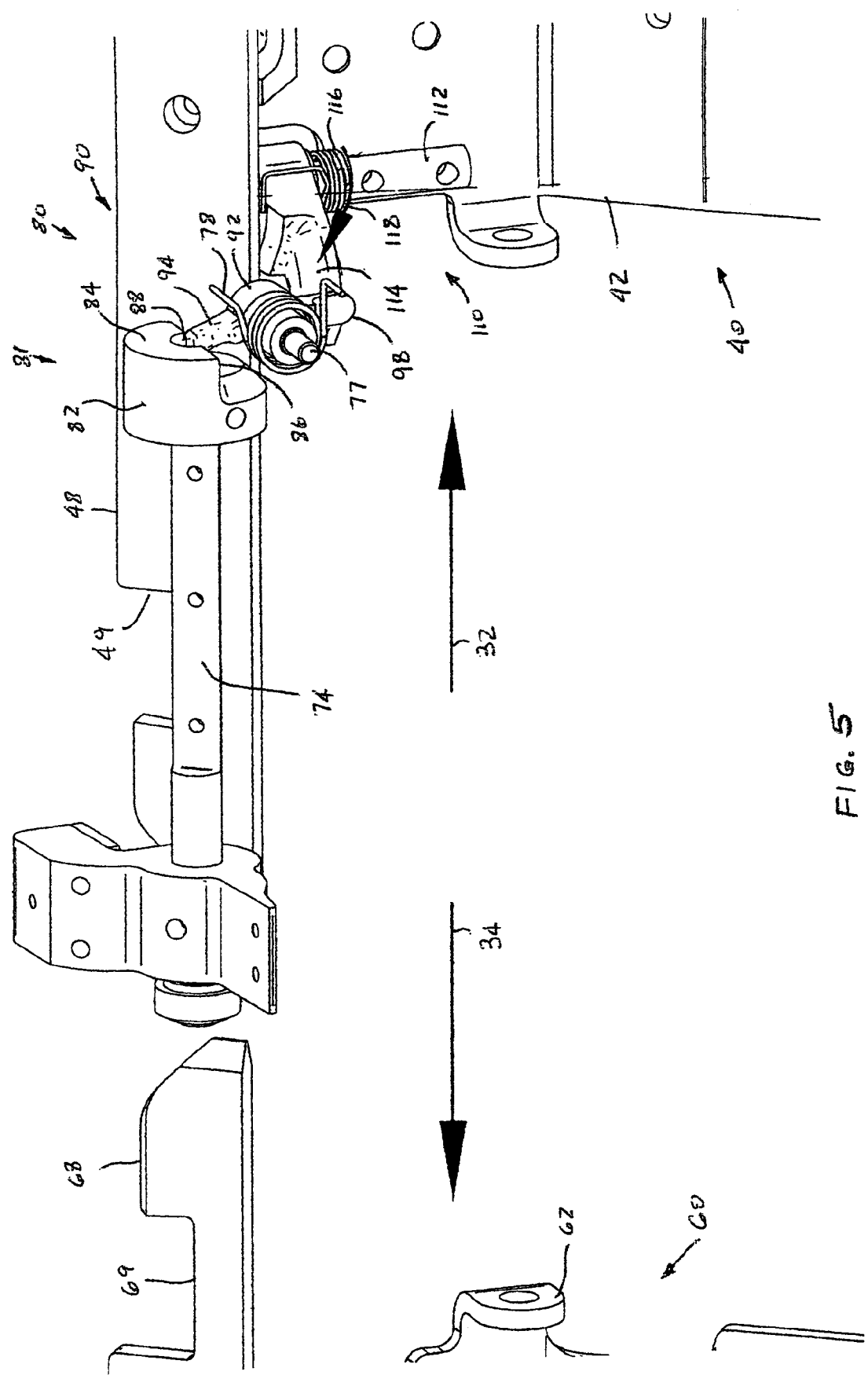
FIG. 5 is a pictorial view of the lock latch mechanism of the present invention, particularly showing orientation of components with the doors at the beginning of the opening movement.

In the door opening sequence as shown in FIG. 5, energization of prime mover 26 causes the first door hanger assembly 40 to move in the opening direction 32 and the second door hanger assembly 60 to move in the opening direction 34. Such movement of the first door hanger assembly 40 causes the reset lever 114 to pivot about mounting portion 112 in the direction 118. Such reset lever 114 further disengages reset portion 98 disposed within the latch lever 90 without pivoting the latch lever 90 about its pivot 77 due to the second spring means 116 biasing such reset lever 114 to pivot in the direction 118.

Figure 6:
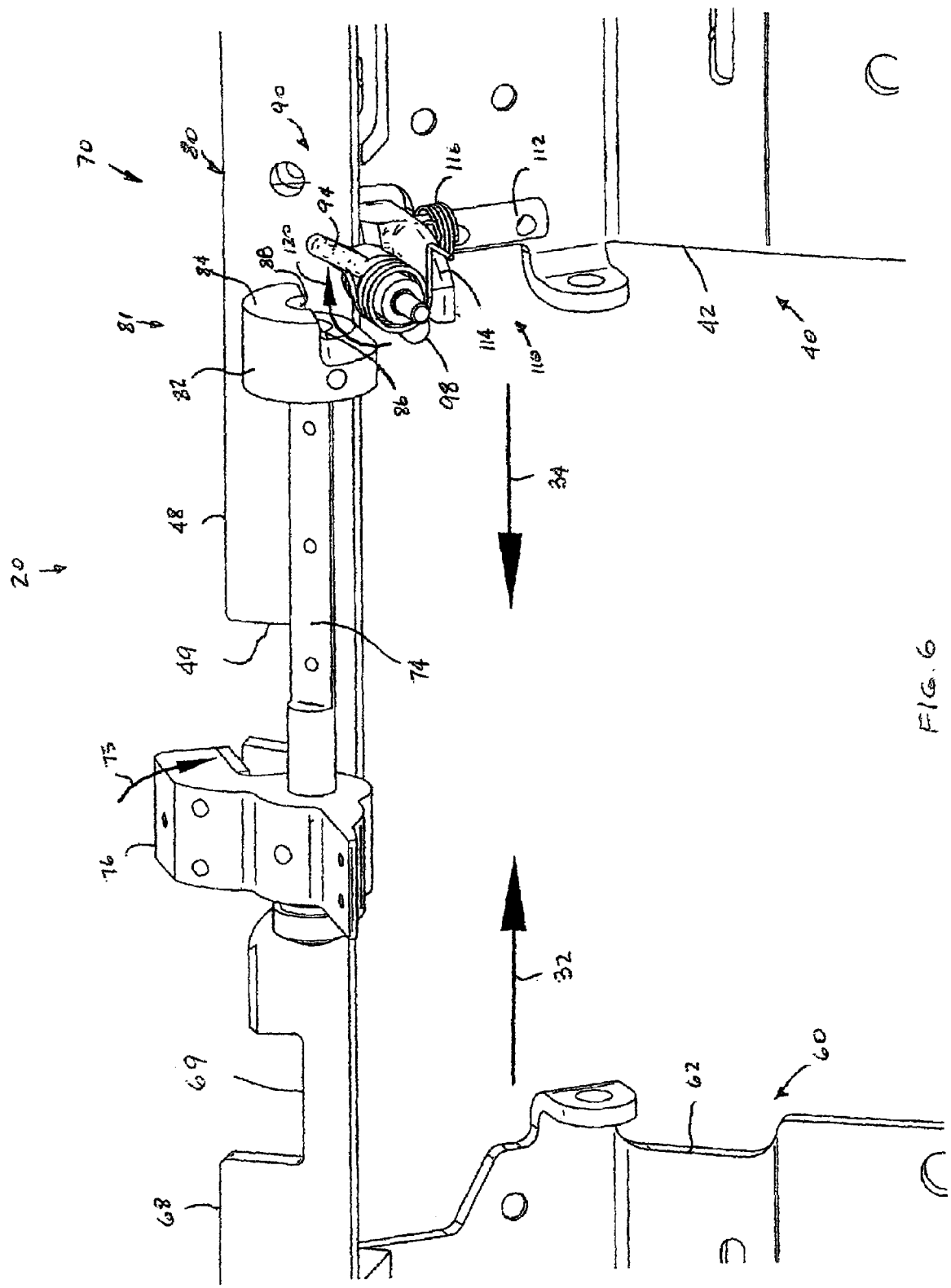
FIG. 6 is a pictorial view of the lock latch mechanism of the present invention, particularly showing orientation of components with the doors at the end of the closing movement.

In the door closing and locking sequence as further shown in FIG. 6, energization of prime mover 26 causes the first door hanger assembly 40 to move in the closing direction 34 and the second door hanger assembly 60 to move in the closing direction 32. Such movement of the first door hanger assembly 40 engages the reset lever 114 with such reset portion 98 causing the reset lever 90 to pivot in the direction 120 disengaging detent portion 94 from the cavity 88 disposed within unlock cam 81. Disengagement of the detent portion 94 will cause lock lever 76 to rotate in the direction 75 and engage first lock bar 48 and second lock bar 68 due to gravity bias and further engaging lock cavities 49 and 69 disposed within such first lock bar 48 and second lock bar 68, respectively. The rotation of the lock lever 76 further causes unlock cam 81 to rotate in the direction 75. Such rotation causing the second portion 84 to engage such detent portion 94, as shown in FIG. 3. A person skilled in the art will recognize that reset of the lock mechanism 70 does not require an independent reset action to dispose components of such lock mechanism 70 from such unlock position into such lock position.

Manual unlocking is enabled by movement of the manual unlock lever 31 causing rotation of such unlock cam 81 to engage detent portion 94 with cavity 88. Furthermore, closing of the (door) either manually, or enabled by prime mover 26, will automatically reset such lock mechanism 70 as discussed above.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art of transit vehicles without departing from the spirit and scope of the invention as set forth in the appended claims.

I claim:

1. A locking device disposed within a door operator of a passenger transit vehicle door system for locking a door hanger of such transit vehicle door system in a fully locked position, said door hanger attached to a door of such transit vehicle, said locking device further unlocking said door hanger of such transit vehicle door system from said fully locked position, said locking device comprising:
    (a) a lock bar disposed within said door hanger, said lock bar having at least one locking cavity;
    (b) a lock shaft disposed within said locking device;
    (c) a lock actuator rotatably attached on said lock shaft for enabling rotation of said lock shaft;
    (d) a lock lever attached to said lock shaft for engagement with said at least one locking cavity for maintaining said door hanger in said fully locked position, said lock lever movable into an unlock position enabled by said lock actuator; and
    (e) a lock latch mechanism disposed within such passenger transit door system, said lock latch mechanism including an unlocking cam attached to one end of said lock shaft for rotation therewith, a lock latch lever pivotally biased for engagement with a first portion of said unlocking cam for maintaining said lock lever in said unlock position and for enabling movement of said door hanger in an opening direction and for enabling movement of said door into an open position, said lock latch lever biased for engagement with a second portion of said unlocking cam when said lock lever engaged with said at least one locking cavity of said lock bar and a reset lever attached to said door hanger and engageable with said lock latch lever for pivotably moving thereof from engagement with said first portion into engagement with said second portion of said unlocking cam and for enabling rotation of said lock shaft and engagement of said lock lever with said locking cavity upon movement of said door hanger in said closing direction.

2. A locking device, according to claim 1, wherein said lock latch mechanism enables removal of power from said lock actuator upon rotation of said lock lever from said fully locked position into said unlock position.

3. A locking device, according to claim 1, wherein said lock latch mechanism enables removal of power from said lock actuator prior to enabling a prime mover disposed within said door operator for opening said door attached to said door hanger.

4. A locking device, according to claim 1, wherein said lock lever is mounted about said lock shaft so that gravity tends to move it into said fully locked position.

5. A locking device, according to claim 1, wherein said actuator is a solenoid.

6. A locking device, according to claim 5, wherein said solenoid is a non-continuous duty type providing more power to move said lock lever from said fully locked position into said unlock position.

7. A locking device, according to claim 1, wherein said actuator is a pneumatic cylinder.

8. A locking device, according to claim 1, wherein said actuator is a hydraulic cylinder.

9. A locking device, according to claim 1, wherein said locking device further includes a manual release lever connected to said lock shaft for manually rotating said lock shaft from said fully locked position into said unlock position and for enabling said lock latch mechanism to maintain said lock lever in said unlocked position for manually moving said door in said opening direction.

10. A locking device disposed within a door operator of a passenger transit vehicle door system for locking a first door hanger of such transit vehicle door system in a fully locked position, said first door hanger attached to a first door of such transit vehicle, said locking device further locking a second door hanger of such transit vehicle door system in said fully locked position, said second door hanger attached to a second door of such transit vehicle, said locking device further for unlocking said first door hanger and said second door hanger of such transit vehicle door system from said fully locked position, said locking device comprising:
(a) a lock shaft disposed within said locking device;
(b) a first lock bar disposed within said first door hanger, said first lock bar having a first lock cavity;
(c) a second lock bar disposed within said second door hanger, said second lock bar having a second lock cavity;
(d) a lock lever pivotably attached on said lock shaft, said lock lever engaging said first lock cavity and said second lock cavity in said fully locked position;
(e) a lock actuator pivotably attached to said lock shaft for enabling said lock lever to move from said fully locked position to an unlock position; and
(f) a lock latch mechanism disposed within such passenger transit door system, said lock latch mechanism including an unlocking cam attached to said lock shaft for rotation therewith, a lock latch lever pivotally biased for engagement with a first portion of said unlocking cam for maintaining said lock lever in said unlock position and for enabling movement of said first door hanger in a first opening direction and said second door hanger in a second opening direction and for enabling movement of said first door into a first open position and movement of said second door into a second open position, said lock latch lever biased for engagement with a second portion of said unlocking cam when said lock lever engaged with said first lock cavity and said second lock cavity, and a reset lever attached to one of said first and said second door hanger and engageable with said lock latch lever for pivotably moving thereof from engagement with said first portion into engagement with said second portion of said unlocking cam and for enabling rotation of said lock shaft and engagement of said lock lever with said first lock cavity and said second lock cavity in said fully locked position upon movement of said first door hanger in a first closing direction and said second door hanger in a second closing direction.

11. A locking device, according to claim 10, wherein said locking device further includes a manual release lever connected to said lock shaft for manually rotating said lock shaft from said fully locked position into said unlock position and for enabling said lock latch mechanism to maintain said lock lever in said unlocked position for manually moving said first door in said first opening direction and said second door in said second opening direction.

* * * * *